US011904387B2

(12) United States Patent
Du Tertre et al.

(10) Patent No.: US 11,904,387 B2
(45) Date of Patent: Feb. 20, 2024

(54) STRUCTURE FOR ASSEMBLING A PIECE COMPRISING A FIRST METAL PART AND A SECOND PART MADE OF AN ORGANIC MATRIX COMPOSITE MATERIAL

(71) Applicant: ARIANEGROUP SAS, Les Mureaux (FR)

(72) Inventors: Alban Du Tertre, Vernon (FR); Didier Guichard, Vernon (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 17/999,343

(22) PCT Filed: May 11, 2021

(86) PCT No.: PCT/FR2021/050811
§ 371 (c)(1),
(2) Date: Nov. 18, 2022

(87) PCT Pub. No.: WO2021/234244
PCT Pub. Date: Nov. 25, 2021

(65) Prior Publication Data
US 2023/0184199 A1 Jun. 15, 2023

(30) Foreign Application Priority Data
May 20, 2020 (FR) ...................................... 2005270

(51) Int. Cl.
*F02K 9/34* (2006.01)
*F02K 9/62* (2006.01)
(Continued)

(52) U.S. Cl.
CPC .............. *B22F 10/25* (2021.01); *B22F 5/008* (2013.01); *B22F 7/062* (2013.01); *F02K 9/346* (2013.01); *F02K 9/62* (2013.01); *B33Y 80/00* (2014.12)

(58) Field of Classification Search
CPC ................................... F02K 9/346; F02K 9/62
See application file for complete search history.

(56) References Cited

U.S. PATENT DOCUMENTS 5,160,392 A * 11/1992 Thongs, Jr. ............. B29C 70/86
156/175
5,570,573 A * 11/1996 Bonnelie .................. F02K 9/343
60/253
(Continued)

FOREIGN PATENT DOCUMENTS

EP 3159525 A1 4/2017
EP 3498410 A1 6/2019
(Continued)

OTHER PUBLICATIONS

French Search Report issued in French Application No. FR 2005270 dated Feb. 4, 2021 (2 pages).
(Continued)

*Primary Examiner* — Craig Kim
(74) *Attorney, Agent, or Firm* — Bookoff McAndrews, PLLC

(57) ABSTRACT

Piece comprising a first metal part and a second part in organic matrix composite material, wherein the first part has a first connecting portion and the second part has a second connecting portion, the second connecting portion having at least one through-hole, the second connecting portion being totally or partially sandwiched between the first connecting portion and a metal fastening element, the fastening element being fastened on the first part both onto the first connecting portion via the through-hole of the second connecting por- (Continued)

tion and onto a portion other than the first connecting portion, whereby the first part and the second part are fastened to each other.

10 Claims, 3 Drawing Sheets

(51) Int. Cl.
*B22F 10/25* (2021.01)
*B22F 5/00* (2006.01)
*B22F 7/06* (2006.01)
*B33Y 80/00* (2015.01)

(56) References Cited

U.S. PATENT DOCUMENTS

| | | | | |
|---|---|---|---|---|
| 5,669,812 A * | 9/1997 | Schockemoehl | ....... | F02K 1/822 454/45 |
| 5,755,401 A * | 5/1998 | Frey | ...................... | F42B 10/663 244/3.22 |
| 6,889,496 B2 * | 5/2005 | Beyer | ....................... | F02K 9/64 29/890.01 |
| 8,429,916 B2 * | 4/2013 | Rudrapatna | ............. | F23R 3/002 277/644 |
| 9,759,163 B2 * | 9/2017 | Indersie | ..................... | F02K 9/32 |
| 10,451,006 B2 * | 10/2019 | Du Tertre | ................. | F02K 9/52 |
| 10,954,892 B2 * | 3/2021 | Patel | ......................... | F02K 9/97 |
| 11,333,105 B1 * | 5/2022 | Gradl | ...................... | B32B 9/041 |
| 11,703,078 B2 * | 7/2023 | Funck | ...................... | F16C 7/026 428/113 |
| 2005/0188678 A1 * | 9/2005 | Haggander | ............. | F02K 9/343 60/266 |
| 2009/0235636 A1 * | 9/2009 | Oehrlein | .................... | F02K 9/64 60/200.1 |
| 2013/0219901 A1 * | 8/2013 | Indersie | ..................... | F02K 9/97 60/770 |
| 2017/0107945 A1 * | 4/2017 | Tertre | ......................... | F02K 9/52 |
| 2018/0135562 A1 * | 5/2018 | Shigley | ................... | F02K 9/343 |
| 2019/0257333 A1 * | 8/2019 | Fujiwara | ................ | B23K 33/00 |
| 2023/0184199 A1 * | 6/2023 | Du Tertre | ................. | B22F 7/08 60/200.1 |
| 2023/0202121 A1 * | 6/2023 | Du Tertre | ............. | B29C 66/721 428/457 |

FOREIGN PATENT DOCUMENTS

| | | | | |
|---|---|---|---|---|
| GB | 2550966 A | * | 12/2017 | ........... B23K 26/244 |
| GB | 2550966 A | | 12/2017 | |

OTHER PUBLICATIONS

International Search Report issued in International Application No. PCT/FR2021/050811 dated Aug. 17, 2021 (2 pages).

* cited by examiner

STRUCTURE FOR ASSEMBLING A PIECE COMPRISING A FIRST METAL PART AND A SECOND PART MADE OF AN ORGANIC MATRIX COMPOSITE MATERIAL

CROSS-REFERENCE TO RELATED APPLICATION(S)

This patent application is a U.S. national stage entry of International Application No. PCT/FR2021/050811, filed on May 11, 2021, which claims priority to French Application No. FR 2005270, filed on May 20, 2020.

TECHNICAL FIELD

The present disclosure relates to a piece comprising a metal part and a part made of an organic matrix composite material assembled together. For example, said part can be a jacket of a rocket engine combustion chamber, but not limited thereto.

PRIOR ART

Pieces are known comprising a metal part and a part in composite material with organic matrix that are assembled together. However, the assembling of these two parts can most often be improved upon. There is therefore a need in this respect.

SUMMARY OF THE INVENTION

One embodiment concerns a piece comprising a first metal part and a second part in organic matrix composite material, wherein the first part has a first connecting portion and the second part has a second connecting portion, the second connecting portion having at least one through-hole, the second connecting portion being totally or partially sandwiched between the first connecting portion and a metal fastening element, the fastening element being fastened on the first part both onto the first connecting portion via the through-hole of the second connecting portion and onto a portion other than the first connecting portion, whereby the first part and the second part are fastened to each other.

It will be understood that the connecting portion of a part is the portion that is in contact with and directly cooperates with the other part. Therefore, a portion of a part which does not cooperate with the other part e.g. is not superimposed over or does not overlap the connecting portion of the other part, does not belong to the connecting portion of said part.

It will also be understood that the second connecting portion has one or more through-holes. Hereafter, and unless otherwise stated, by «the through-hole» it is meant «the at least one through-hole».

For example, the fastening element is of same metal grade as that of the first part, but not necessarily.

The fastening element is fastened to the first part by clamping at least part of the second connecting portion. Therefore, the second connecting portion is locked between the first connecting portion and the fastening element.

The fastening element is fastened to the first part at two points. The fastening element is fastened to the first part and more particularly to the first connecting portion, and extends through the through-hole of the second connecting portion. The fastening element is also directly fastened to the first part on a portion other than the first connecting portion. Therefore, there are two mechanical links between the fastening element and the first part. This makes it possible to assemble the first part with the second part.

Compared with pieces known in the prior art, said assembly structure allows multiplication of attachment zones and therefore better distribution of applied mechanical forces. Also, by totally or partially sandwiching the second connecting portion, that part of the second connecting portion sandwiched between the first part and the fastening element is perfectly locked in position, in particular under flexion. This has the effect of rigidifying and mechanically reinforcing the assembly structure of the present disclosure compared with pieces known in the prior art. In particular, by reducing flexural strain in the vicinity of the through-hole, pull-out stresses on the attachment between the fastening element and first connecting portion are reduced.

For example, the parts can be planar or curved plates and the fastening portions can form planar or curved flanges.

For example, the first part and the second part each form a plate extending in a first direction and in a second direction, and having a thickness in a third direction perpendicular to the first and second direction, the first part and the second part being arranged side-by-side in the first direction, the at least one through-hole extending in the third direction, the first and second connecting portion overlapping each other in the first and second direction, the fastening element and the first connecting portion being arranged either side of the second connecting portion in the third direction. The first and/or second direction can be rectilinear or curved, in similar manner to the directions defined in a Cartesian, cylindrical or spherical coordinate system.

In some embodiments, the first connecting portion has at least one blind hole respectively extending in the continuation of at least one through-hole of the second connecting portion, the fastening element being fastened to the first connecting portion and extending into the blind hole.

For example, the blind hole extends in the third direction. A blind hole is to be construed as a hole which has only one orifice and therefore forms a concavity.

It will be understood that the fastening element is engaged with the first part and more specifically with the first connecting portion, in the blind hole. This reinforces the mechanical link between the fastening element and the first part, in particular against shear (i.e. direction transverse to the geometric axis of the blind hole), but also against tensile stresses (i.e. in a direction parallel to the geometric axis of the blind hole), by affording a larger gripping surface.

In some embodiments, the blind hole has an entrance, a bottom, a side wall extending between the entrance and the bottom and a geometric axis, the side wall of the blind hole being inclined relative to the geometric axis of the through-hole to form a convergent from the entrance towards the bottom.

In other words, the side wall of the blind hole has at least one inclined portion relative to the geometric axis of the blind hole and oriented so that it faces the fastening element. This provides an increase in the fastening surface between the fastening element and the first connecting portion, whereby the mechanical link is reinforced. Additionally, said configuration is particularly adapted when the fastening element is formed via additive manufacturing by cold gas spray depositing of a metal powder.

In some embodiments, the through-hole has a side wall and a geometric axis, the side wall of the through-hole being inclined relative to the geometric axis of the through-hole to form a convergent from the fastening element towards the first connecting portion.

It will be understood that the geometric axis of the through-hole is coaxial with the geometric axis of the blind hole. It will also be understood that the side wall of the through-hole has at least one portion that is inclined relative to geometric axis of the through-hole, and oriented so that it lies opposite the fastening element. For example, the side wall of the blind hole extends in the continuation of the side wall of the through-hole.

This makes it possible to increase the cooperating surface between the fastening element and the second connecting portion, and by means of which the mechanical link is reinforced. Also, said configuration is particularly adapted when the fastening element is formed via additive manufacturing by cold gas spray deposition of a metal powder.

In some embodiments, the first connecting portion comprises a shoulder configured to cooperate with the second connecting portion.

The shoulder provides an additional cooperating surface between the first and second part, and reinforces the strength of the assembly. For example, the first portion forms a step defining a shoulder. For example, the shoulder extends in the second and third direction.

In some embodiments, the fastening element is formed via additive manufacturing by cold gas spray deposition of a metal powder known under the abbreviation CGS for «Cold Gaz Spraying».

It will be understood that additive manufacturing by cold gas spray deposition of a metal powder is an additive manufacturing mode whereby the metal is deposited at a temperature lower than its melt point. Said deposit mode is particularly adapted for the part since it is ensured that the temperature of the metal at the time of deposit remains lower than the deterioration temperature of the organic matrix composite material of the second part.

Said fastening element is particularly easy to produce, avoids the need for prior art welding or bolting steps and is therefore of relatively reduced mass.

In some embodiments, a protective layer is arranged between the fastening element and the second connecting portion.

Said protective layer provides protection for the second connecting portion, for example when the fastening element is formed by cold gas spraying a metal powder. This makes it possible to ensure the mechanical integrity of the second connecting portion, and hence to ensure the mechanical strength of the assembly. For example, the protective layer can extend over the entire interface between the second part and the fastening element.

In some embodiments, the piece is of general shape with rotational symmetry.

The assembly structure of the present disclosure is particularly well suited for annular parts.

In some embodiments, the piece forms a jacket for rocket engine combustion chamber.

The assembly structure of the present disclosure is particularly well adapted for a jacket of a rocket engine combustion chamber.

One embodiment also concerns a rocket engine comprising a piece according to any of the embodiments described in the present disclosure, and in particular a combustion chamber jacket according to any of the embodiments described in the present disclosure.

BRIEF DESCRIPTION OF THE DRAWINGS

The subject of the present disclosure and advantages thereof will be better understood on reading the following detailed description of different embodiments given as non-limiting examples. This description refers to the pages of appended Figures in which.

DESCRIPTION OF EMBODIMENTS

Figure 1:
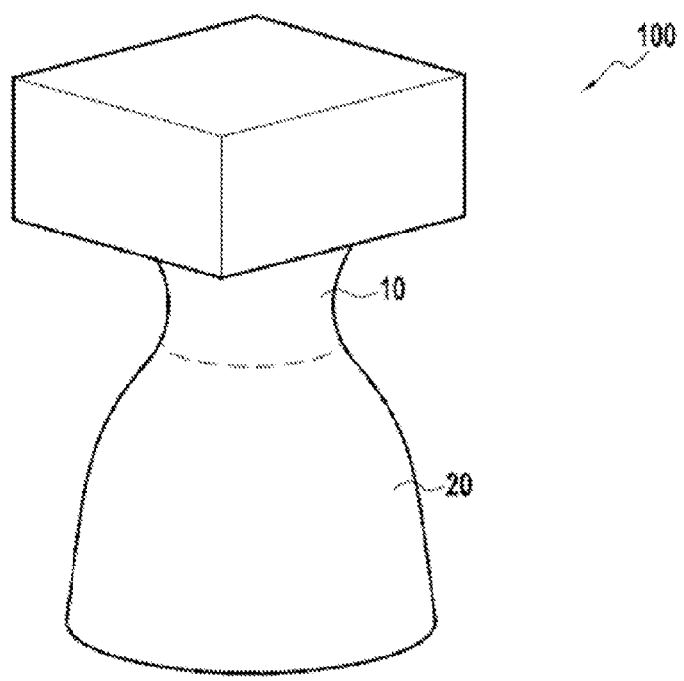
FIG. 1 illustrates a rocket engine.
Figure 2:
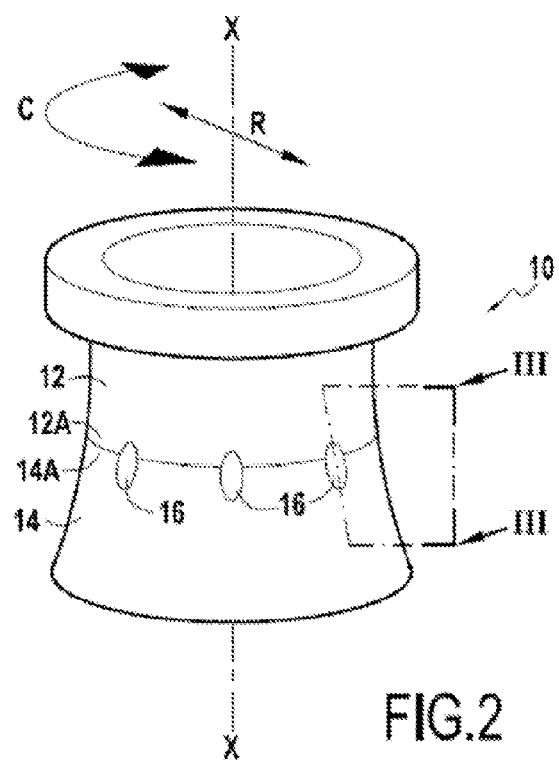
FIG. 2 illustrates the jacket of the combustion chamber of the rocket engine in FIG. 1.
Figure 3:
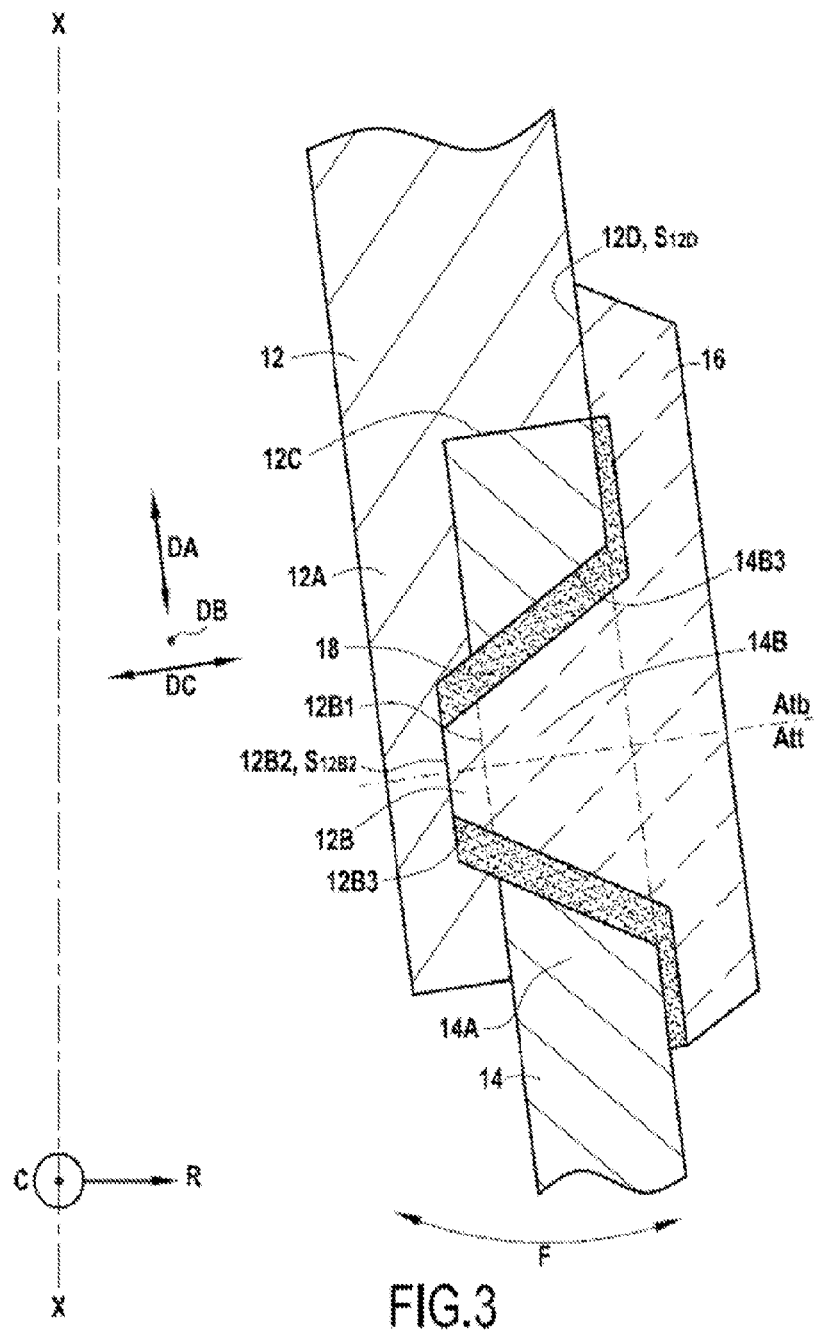
FIG. 3 illustrates the assembly structure between a metal part and a part in organic matrix composite material of the combustion chamber jacket in FIG. 2.

For clarity of the present disclosure, it is noted that the views in FIGS. 1 to 3 are largely schematic. FIG. 1 illustrates a rocket engine 100 comprising a combustion chamber jacket 10 opening onto an exhaust nozzle 20. FIG. 2 illustrates the combustion chamber jacket 10 comprising a first metal part 12, a second part in organic matrix composite material 14 and a plurality of fastening elements 16 to secure the first part 12 with the second part 14. In this example, the combustion chamber jacket 10 is a part of general shape having rotational symmetry with axis X, the first part 12 and second part 14 each substantially being in the general form of annular plates. In general, in this example, the axial direction corresponds to the direction of the geometric axis X of part 10, and a radial direction R is a direction perpendicular to axis X. The azimuth or circumferential direction C corresponds to the direction describing a ring around the axial direction X. The three directions, axial, radial and azimuth, respectively correspond to the directions defined by the height, radius and angle in a system of cylindrical coordinates.

The first and second parts 12 and 14 form plates extending in a first direction DA (in this example the first direction is inclined relative to the axial direction X) and in a second direction DB (in this example, the second direction DB being parallel to the circumferential direction C), and having a thickness in a third direction DC perpendicular to the first and second direction DA and DB. In this example, the marker DA, DB and DC forms a local reference point in the marker X, C, R.

In this example, the first part 12 is in a metal alloy e.g. a nickel alloy, the second part 14 is in composite material with organic matrix e.g. of thermoplastic or thermosetting type, and the fastening elements 16 are in a metal alloy of steel or nickel type. Other materials can be envisaged. In one variant, the plurality of fastening elements 16 is replaced by a single annular flange.

FIG. 3 is a cross-sectional view along plane III in FIG. 2 of the assembled structure of the first part 12 with the second part 14 by means of a fastening element 16. Evidently, the description below applies to all attachments comprising a fastening element 16.

The first part 12 comprises a first connecting portion 12A having a blind hole 12B and a shoulder 12C. The blind hole 12B has a geometric axis Atb extending in the third direction DC between an entrance 1261 and a bottom 1262, and has a side wall 1263 extending between the entrance 1261 and bottom 12B2. In this example, the blind hole 12B is of frustoconical shape, the side wall 1263 being uniformly inclined relative to axis Atb, forming a convergent from the entrance 1261 towards the bottom 1262. Evidently, any other shape of blind hole can be envisaged. The shoulder 12C extends crosswise to the first direction DA. In other words, in this example, the shoulder 12C extends in the second direction DB and the third direction DC. The first connecting portion 12A therefore forms a step receiving a second connecting portion 14A described below of the second part 14, the second part 14 cooperating in abutment in the axial direction X (and in the first direction DA) with the shoulder 12C. The first part 12 and the second part 14 are arranged side-by-side in the first direction DA.

The second part 14 has a second connecting portion 14A having a through-hole 14B. The through-hole 14B has a geometric axis Att, merging with the geometric axis Atb of the blind hole 126, which extends in the third direction DC, and has a side wall 1463. In this example, the through-hole 14B is of frustoconical shape, the side wall 1463 being uniformly inclined relative to axis Att, forming a convergent from the fastening element 16 towards the first connecting portion 12A. Evidently, any other through-hole shape can be envisaged. In one variant, the second connecting portion 14A has two or more through-holes, and the first connecting portion 12A comprises as many blind holes, or fewer.

In this example, a protective layer 18 is arranged between the fastening element 16 and the second connecting portion 14A. More particularly, in this example, the protective layer 18 extends over the entire interface of the second part 14 with the fastening element 16. In other words, in this example, the protective layer 18 extends not only over the side wall 1463 of through-hole 14B but also over the walls of the second part 14 lying opposite the fastening element 16.

For example, this protective layer 18 is formed by a metal foil or by metal deposit via additive manufacturing of metal arc wire type. For example, the protective layer 18 is sealingly joined to the bottom 12132 of the blind hole 126, for example with a copper seal.

In this example, the fastening element 16 is formed via additive manufacturing by cold gas spray deposition of a metal powder. The protective layer 18 being sealingly attached onto the bottom 1262, this prevents any leakage of material when it is sprayed to form the fastening element 16, thereby improving the quality of fastening and hence the mechanical strength thereof.

The fastening element 16 clamps a portion of the second connecting portion 14A with the first part 12, in the first direction DA. The fastening element 16 is fastened onto the first connecting portion 12A in the blind hole 12B, extending through the through-hole 14B of the second connecting portion 14A. The fastening element 16 is also fastened onto the first part 12 on a different portion of the first connecting portion 12A, in this example on a portion 12D adjacent to the first connecting portion 12A. In other words, the fastening element 16 forms a fastening «bridge» between the first connecting portion 12A and the adjacent portion 12D, which together with the first part 12 sandwiches part of the second connecting portion 14A.

For example, the contact surface $S_{12D}$ between portion 12D and the first part 12 is greater than or equal to the surface $S_{12B2}$ of the bottom 12B2 of the blind hole 12B (i.e. $S_{12D} \geq S_{12B2}$).

Said fastening element 16 fastened onto two portions of the first part 12 allows locking of the clamped part of the second connecting portion 14A and rigidification of the assembly, which particularly reduces flexural strain F (over the circumferential direction C) of the assembly. The points of attachment are therefore less subject to stress and have their mechanical strength reinforced. With regard to a fastening element forming an annular flange extending over the entire circumferential direction C, flexural strain over the axial direction X of the assembly is also reduced.

In addition the fastening of the fastening element 16 onto two portions of the first part 12 allows better distribution of shear forces (i.e. forces oriented transverse to the radial direction R or along a plane defined by the axial X and circumferential C directions). Finally, the pull-out strength in radial direction R is also improved.

Although the present invention has been described with reference to specific embodiments, modifications and changes can evidently be made to these examples without departing from the general scope of the invention such as defined by the claims. In particular, individual characteristics of the different illustrated/mentioned embodiments can be combined in additional embodiments. The description and drawings are therefore to be construed as illustrative rather than restrictive.

Also evidently, all the characteristics described with reference to a method can be transposed, alone or in combination, to a device and conversely all the characteristics described with reference to a device can be transposed, alone or in combination, to a method.

The invention claimed is:

1. A piece comprising a first metal part and a second part in organic matrix composite material, wherein the first part has a first connecting portion and the second part has a second connecting portion, the second connecting portion having at least one through-hole, the second connecting portion being totally or partially sandwiched between the first connecting portion and a metal fastening element, the fastening element being fastened on the first part both onto the first connecting portion via the through-hole of the second connecting portion and onto a portion other than the first connecting portion, whereby the first part and the second part are fastened to each other.

2. The piece according to claim 1, wherein the first connecting portion has at least one blind hole respectively extending in the continuation of at least one through-hole of the second connecting portion, the fastening element being fastened to the first connecting portion and extending into the blind hole.

3. The piece according to claim 2, wherein the blind hole has an entrance, a bottom, a side wall extending between the entrance and the bottom and a geometric axis the side wall of the blind hole being inclined relative to the geometric axis of the blind hole to form a convergent from the entrance towards the bottom.

4. The piece according to claim 1, wherein the through-hole has a side wall and a geometric axis, the side wall of the through-hole being inclined relative to the geometric axis of the through-hole to form a convergent from the fastening element towards the first connecting portion.

5. The piece according to claim 1, wherein the first connecting portion comprises a shoulder configured to cooperate with the second connecting portion.

6. The piece according to claim 1, wherein the fastening element is formed via additive manufacturing by cold gas spray deposition of a metal powder.

7. The piece according to claim 1, wherein a protective layer is arranged between the fastening element and the second connecting portion.

8. The piece according to claim 1, of general shape with rotational symmetry.

9. The piece according to claim 8 forming a combustion chamber jacket of a rocket engine.

10. A rocket engine comprising a combustion chamber jacket according to claim 9.

* * * * *